(12) United States Patent  
Willems, Jr. et al.

(10) Patent No.: US 7,298,585 B1  
(45) Date of Patent: Nov. 20, 2007

(54) STORAGE MEDIUM LOAD AND UNLOAD APPARATUS WITH AN IMPACT DIVERTER

(75) Inventors: John D. Willems, Jr., Arvada, CO (US); William J. Vanderheyden, Loveland, CO (US)

(73) Assignee: Storage Technology Corporation, Louisville, CA (US)

( * ) Notice: Subject to any disclaimer, the term of this patent is extended or adjusted under 35 U.S.C. 154(b) by 543 days.

(21) Appl. No.: 10/750,231

(22) Filed: Dec. 31, 2003

(51) Int. Cl.  
*G11B 5/012* (2006.01)

(52) U.S. Cl. .................................. 360/99.02

(58) Field of Classification Search ............ 360/99.01, 360/99.02, 99.06, 99.07, 93, 96.5; 720/627, 720/628  
See application file for complete search history.

(56) References Cited

U.S. PATENT DOCUMENTS

| | | | |
|---|---|---|---|
| 3,903,544 A | 9/1975 | Nakamichi | 360/96 |
| 4,628,382 A * | 12/1986 | Okumura | 360/93 |
| 4,831,472 A * | 5/1989 | Ando et al. | 360/96.5 |
| 5,055,953 A * | 10/1991 | Tsuchiya | 360/96.5 |
| 5,233,490 A * | 8/1993 | Nakanishi | 360/96.5 |
| 5,249,088 A * | 9/1993 | Matsuda et al. | 360/96.5 |
| 5,293,550 A * | 3/1994 | Toyoguchi et al. | 360/96.5 |
| 5,452,154 A | 9/1995 | Asakura et al. | 360/96.5 |
| 5,610,892 A | 3/1997 | Choi | 369/77.2 |
| 5,615,197 A * | 3/1997 | Choi | 720/627 |
| 5,629,818 A | 5/1997 | Schandl et al. | 360/96.5 |
| 5,631,790 A | 5/1997 | Gelardi et al. | 360/132 |
| 5,784,222 A | 7/1998 | Nawa et al. | 360/96.5 |
| 5,978,173 A | 11/1999 | Chu et al. | 360/96.5 |
| 6,392,836 B1 | 5/2002 | Kim | 360/96.5 |
| 7,072,139 B2 * | 7/2006 | Tsuchiya | 360/96.5 |
| 2003/0128455 A1 | 7/2003 | Blair et al. | 360/69 |

FOREIGN PATENT DOCUMENTS

| | | |
|---|---|---|
| EP | 0 392 491 | 10/1990 |
| EP | 0 583 098 | 2/1994 |
| JP | 56111171 | 9/1981 |
| JP | 57121230 | 7/1982 |
| JP | 61029452 | 2/1986 |
| JP | 61271650 | 12/1986 |
| JP | 1199355 | 8/1989 |
| JP | 9055002 | 2/1997 |
| JP | 2000137965 | 5/2000 |
| WO | WO 93/22766 | 11/1993 |
| WO | WO 99/67776 | 12/1999 |

* cited by examiner

*Primary Examiner*—Tianjie Chen  
(74) *Attorney, Agent, or Firm*—Brooks Kushman P.C.

(57) ABSTRACT

A storage medium load and unload apparatus for diverting a storage medium insertion impact force is provided. The load and unload apparatus comprises a shuttle having a first pin with a first radius extending from a side surface of the shuttle and a protrusion having a posterior edge extending from the side surface. The protrusion posterior edge is displaced a first distance from a center of the pin. A fixed side plate has a flange with a vertical edge, and a first slot with an anterior edge and a curved posterior edge. A first width is provided between the anterior edge and the curved posterior edge of the first slot. The vertical edge of the flange is displaced a second distance from the anterior edge of the first slot. The first pin is engaged with the first slot. A sum of the first width and the second distance is greater than the sum of the first distance and the first radius.

18 Claims, 7 Drawing Sheets

STORAGE MEDIUM LOAD AND UNLOAD APPARATUS WITH AN IMPACT DIVERTER

BACKGROUND OF THE INVENTION

1. Field of the Invention

The present invention relates generally to a storage media loading and unloading apparatus, and particularly to an apparatus and method for diverting the impact applied to a side rail elevator or side cam elevator in a storage medium load and unload apparatus.

2. Background of the Invention

The field of information storage has developed over recent decades to include many types of storage media. Magnetic storage media, such as tape or discs, enjoy widespread use in industry and private activities. Magnetic information storage typically uses cassettes storing either tape or discs that are inserted into read and/or write devices for accessing information on the medium or writing information to the medium.

The techniques used to load and unload storage media into a read/write device typically include a magazine or shuttle for moving the storage medium into and out of a space within the read/write device. When the storage medium is inside the shuttle, the storage medium is placed in proximity with a head that accesses information on the storage medium. A magnetic coupling system is typically used to hold the storage medium onto a supply side motor.

When loading the storage medium into the shuttle, an impact force is transferred from the shuttle to the elevator. Side rail elevator actuation mechanisms for lifting and lowering the shuttle away from and into proximity with a read or write device typically include guide pins that extend from side surfaces of the shuttle and engage with a moveable side plate that supplies vertical or horizontal motion to the shuttle. The impact force delivered to the guide pins may damage or shear the guide pins from the shuttle surface. The force that is transferred from the guide pin to the actuator side plate may damage the side plate as well.

It would be advantageous to provide a mechanism that diverts the impact force away from the guide pins of an elevator in a storage medium load and unload apparatus.

SUMMARY OF THE INVENTION

The present invention provides a storage medium load and unload apparatus for diverting a storage medium insertion impact force. The load and unload apparatus comprises a shuttle having a first pin with a first radius extending from a side surface of the shuttle and a protrusion having a posterior edge extending from the side surface. The protrusion posterior edge is displaced a first distance from a center of the pin. A fixed side plate has a flange with a vertical edge, and a first slot with an anterior edge and a curved posterior edge. A first width is provided between the anterior edge and the curved posterior edge of the first slot. The vertical edge of the flange is displaced a second distance from the anterior edge of the first slot. The first pin is engaged with the first slot. A sum of the first width and the second distance is greater than the sum of the first distance and the first radius.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention and its advantages are best understood by referring to illustrative embodiments depicted in FIGS. 1 through 10 of the drawings. In the figures, like numerals are used for like and corresponding parts of the various drawings.

Figure 1:
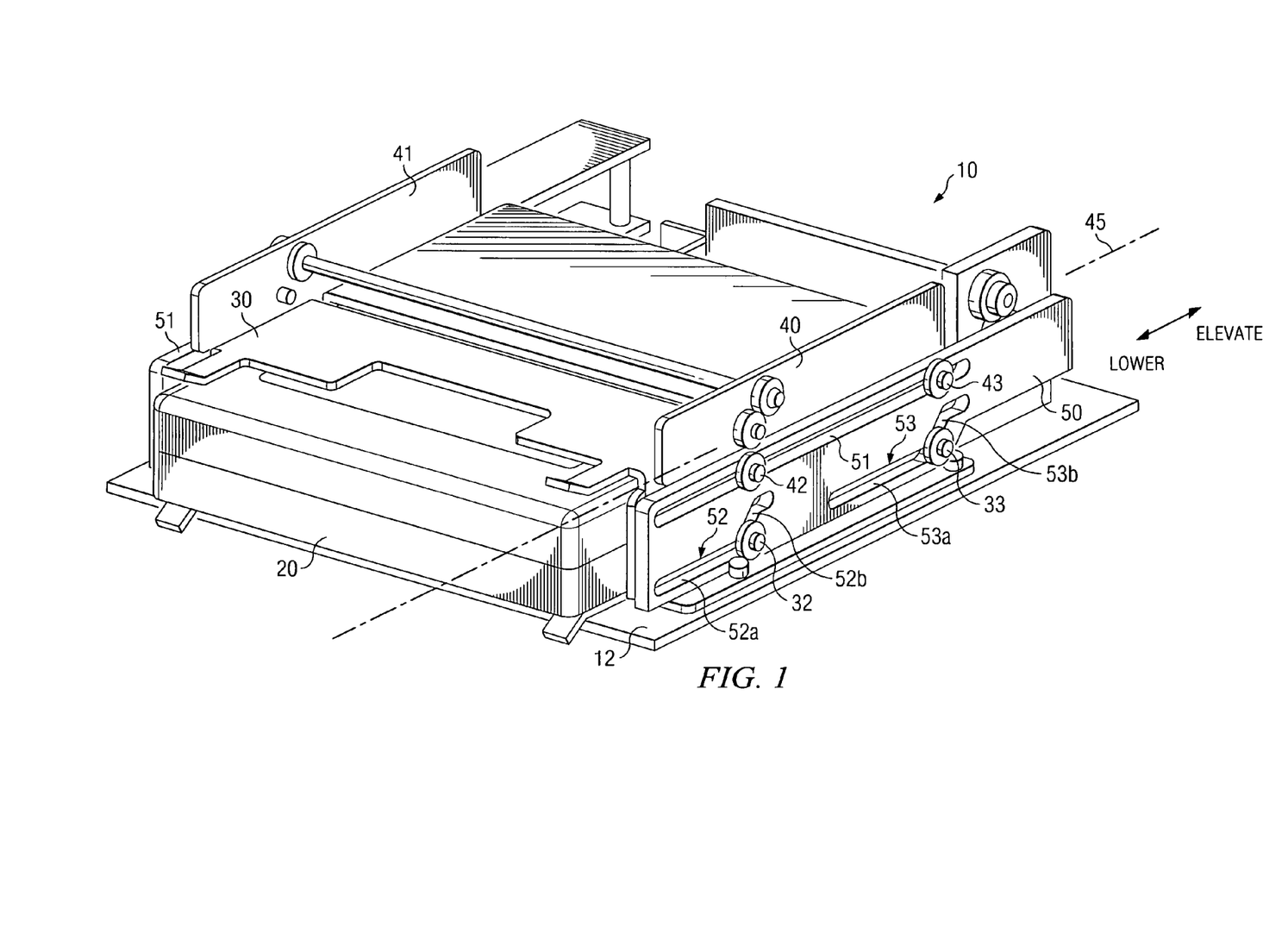
FIG. 1 is a diagrammatic perspective illustration of a load and unload apparatus for guiding and securing a storage medium into proximity with a read/write device in accordance with a preferred embodiment of the present invention.

FIG. 1 is a diagrammatic perspective illustration of load and unload apparatus 10 for guiding and securing storage medium 20, such as a magnetic cassette, into proximity with a read/write device in accordance with a preferred embodiment of the present invention. Apparatus 10 comprises base plate 12 and fixed side plates 40 and 41. Additionally, apparatus 10 comprises shuttle 30, or magazine, having a cavity configured to accept storage medium 20 and that carries storage medium 20 when loading and unloading in apparatus 10. Moveable side plates 50 and 51 are respectively adjacent with fixed side plates 40 and 41. Shuttle 30 has guide pins 32 and 33 extending from a side surface of the shuttle.

To guide shuttle 30, moveable side plates 50 and 51 are provided adjacent to side plates 40 and 41. Moveable side plates 50 and 51 are slideably conjoined with fixed side plates 40 and 41. In the illustrative example, moveable side plate 50 is slideably conjoined with fixed side plate 40 by side plate pins 42 and 43 that engage horizontal slot 51 of moveable side plate 50. Side plate pins 42 and 43 extend laterally from side plate 40 and penetrate horizontal slot 51. Engagement of side plate pins 42 and 43 with horizontal slot 51 constrains the movement of moveable side plate 50 to a rectilinear motion parallel to longitudinal axis 45 of fixed side plate 40. Moveable side plate 50 is reciprocally displaceable in rectilinear motions. Displacement of moveable side plate in one direction causes shuttle 30 to be lowered, and displacement of moveable side plate 50 in an opposing direction causes shuttle 30 to be elevated. In the illustrative example, the reciprocal displacement of moveable side plate 50 is designated with a double headed arrow.

Moveable side plates 50 and 51 may be driven by a rack and gear assembly, a belt and pulley assembly, or another suitable drive mechanism. In the illustrative examples moveable side plates 50 and 51 are interconnected to provide simultaneous movement therebetween. Moveable side plate 50 has slots 52 and 53 that are partially ramped. In the illustrative example, non-ramped portions of slots 52 and 53 are designated as respective non-ramped slot portions 52a and 53a, and ramped portions of slots 52 and 53 are designated as respective ramped slot portions 52b and 53b. Non-ramped slot portions 52a and 53a are generally parallel with base plate 12. Guide pins 32 and 33 are engaged with slots 52 and 53. Slots 52 and 53 in conjunction with guide pins 32 and 33 provide an elevator mechanism for elevating and lowering shuttle 30.

Figure 2:
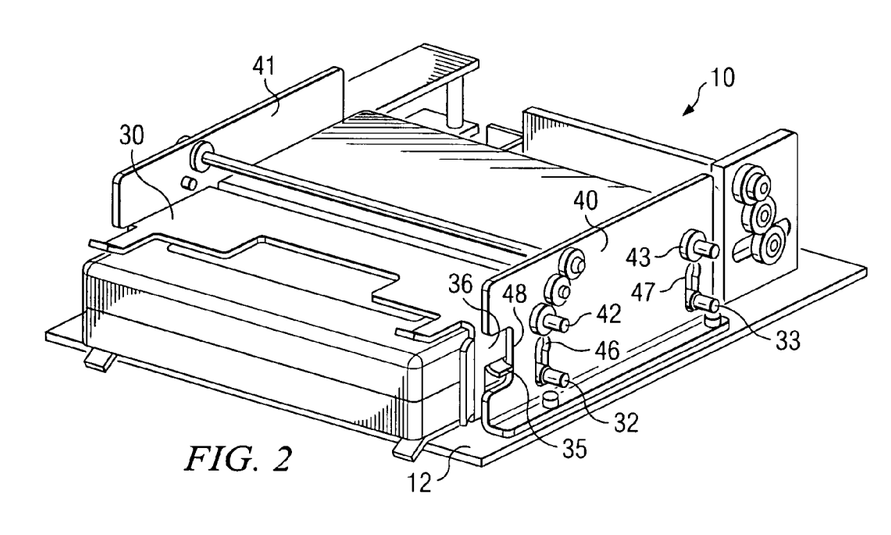
FIG. 2 is a diagrammatic perspective illustration of the load and unload apparatus shown in FIG. 1 with the moveable side plate removed in accordance with a preferred embodiment of the present invention.

With reference now to FIG. 2, a diagrammatic perspective illustration of load and unload apparatus 10 shown in FIG. 1 with moveable side plate 50 removed is shown in accordance with a preferred embodiment of the present invention. Side plate pins 42 and 43 extend laterally from side plate 40. Side plate 40 includes slots 46 and 47 with which respective guide pins 32 and 33 are engageable. Slots 46 and 47 constrain the displacement of guide pins 32 and 33, and thus shuttle 30, to vertical rectilinear motion. Protrusion 35 extends from shuttle side surface 36 and is situated for abutment with flange 48 disposed on side plate 40.

Figure 3:
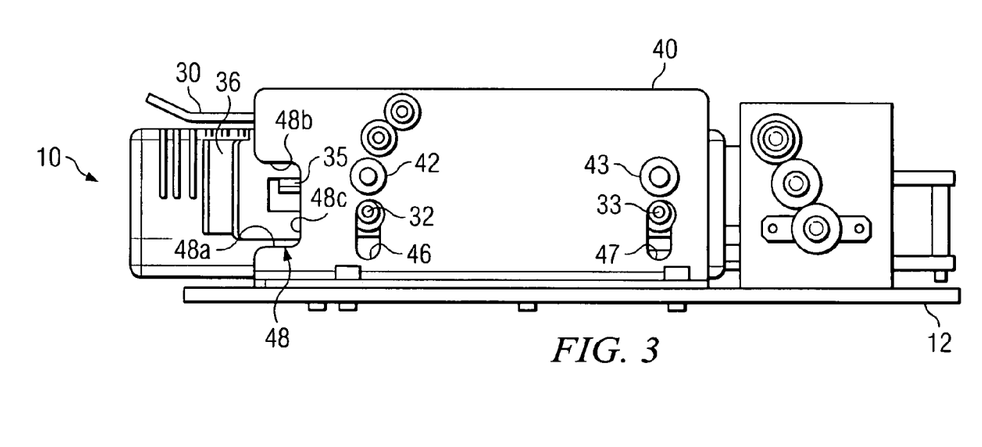
FIG. 3 is a diagrammatic side view illustration of the load and unload apparatus shown in FIGS. 1 and 2 in accordance with a preferred embodiment of the present invention.

FIG. 3 is a diagrammatic side view illustration of apparatus 10 shown in FIGS. 1 and 2 in accordance with a preferred embodiment of the present invention. Flange 48 includes lower edge 48a, upper edge 48b, and vertical edge 48c for allowing protrusion 35 to be vertically displaced when guide pins 32 and 33 are actuated by moveable side plate 50 shown in FIG. 1. Protrusion 35 is positioned on shuttle side surface 36 such that an impact force applied to shuttle 30 by insertion of a storage medium into apparatus 10 is transferred to shuttle side surface 36. Particularly, an impact force applied to shuttle 30 is substantially absorbed by flange 48 and protrusion 35. Accordingly, guide pins 32 and 33 do not receive an impact force when a storage medium is inserted into shuttle 30.

Figure 4:
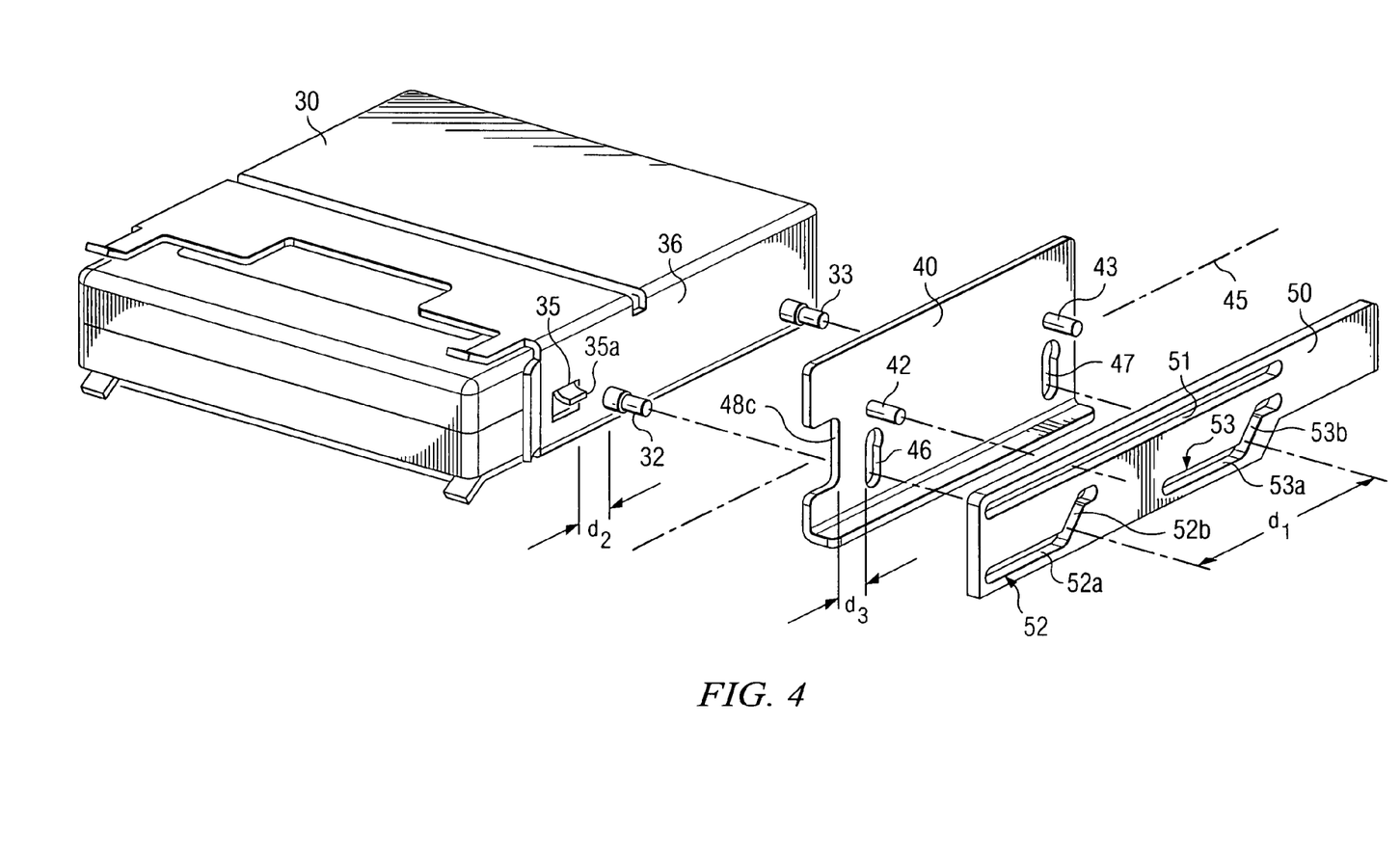
FIG. 4 is a partial exploded perspective view of the load and unload apparatus shown in FIGS. 1-3 in accordance with a preferred embodiment of the present invention.

With reference now to FIG. 4, a partial exploded perspective view of apparatus 10 shown in FIGS. 1-3 is shown in accordance with a preferred embodiment of the present invention. Guide pins 32 and 33 extend from side surface 36 of shuttle 30. Guide pins 32 and 33 are elongate members that extend laterally from shuttle 30 and provide coupling mechanisms between shuttle 30 and moveable side plate 50. Guide pins 32 and 33 pass through slots 46 and 47 of fixed side plate 40 and penetrate slots 52 and 53 of moveable side plate 50. Slots 46 and 47 comprise vertical slots and substantially constrain the motion of shuttle 30 to vertical displacements within apparatus 10.

Alternatively, slots 46 and 47 may comprise vertical and horizontal portions for enabling shuttle 30 to be horizontally, as well as vertically, displaced within apparatus 10. For example, slots 46 and 47 may be implemented as L-shaped slots for enabling shuttle 30 to be reciprocally translated in forward and aft directions for affecting an ejection mechanism.

In this example, centers of guide pins 32 and 33 are longitudinally displaced on shuttle side surface 36 by a guide pin separation distance $d_1$. A posterior edge of protrusion 35 is longitudinally displaced on shuttle side surface 36 from the center of guide pin 32 by a distance $d_2$. Slots 46 and 47 are longitudinally displaced on fixed side plate 40 by the guide pin separation distance $d_1$. Additionally, vertical edge 48c of flange 48 is displaced a distance $d_3$ from an anterior edge of slot 46. Non-ramped slot portions 52a and 53a intersect with ramped slot portions 52b and 53b at respective vertices of slots 52 and 53. Vertices of slots 52 and 53 are longitudinally displaced on moveable side plate 50 by the guide pin separation distance $d_1$. Accordingly, guide pins 32 and 33 pass through slots 46 and 47 and engage slots 52 and 53. Pins 42 and 43 are engaged with horizontal slot 51 and constrain displacement of moveable side plate 50 to horizontal rectilinear motion parallel with longitudinal axis 45 of fixed side plate 40.

It should be apparent that opposing sides of shuttle 30 are similarly configured with apparatus 10. Particularly, a guide pin pair extends from a shuttle surface opposite side surface 36, passes through slots of fixed side plate 41, and engage with partially ramped slots of moveable side plate 51.

Shuttle 30 is elevated and lowered by actuation of moveable side plate 50. As noted above, moveable side plate 50 may be reciprocally driven in rectilinear motions. Guide pins 32 and 33 each rest against a respective surface of non-ramped slot portions 52a and 53a when shuttle 30 is in a loaded position, that is when shuttle 30 is in a lowered position within apparatus 10. A relative movement between guide pins 32 and 33 and slots 52 and 53 is provided by displacement of moveable side plate 50.

During displacement of moveable side plate 50 in the elevate direction, guide pins 32 and 33 move along non-ramped slot portions 52a and 53a until ramped slot portions 52b and 53b are brought into contact with guide pins 32 and 33. Further displacement of moveable side plate 50 in the elevate direction results in guide pins 32 and 33, and thus shuttle 30, being urged upward within slots 46 and 47 by engagement with ramped slot portions 52b and 53b. When guide pins 32 and 33 reach the upper ends of slots 46 and 47, shuttle 30 is fully elevated within apparatus 10. When guide pins 32 and 33 are fully extended vertically upward in slots 46 and 47, shuttle 30 is fully elevated within apparatus 10 and is said to be located in the unloaded position. Storage medium 20 may be removed from shuttle 30 when shuttle 30 is in the unloaded position or, if not storage medium is loaded in shuttle 30, a storage medium may be inserted into shuttle 30.

When a storage medium is inserted into shuttle 30, guide pins 32 and 33 are engaged with respective ramped slot portions 52b and 53b and moveable side plate 50 is then displaced in the lower direction. Moveable side plate 50 continues moving in the lower direction until guide pins 32 and 33 are engaged with non-ramped slot portions 52a and 53a.

Figure 5:
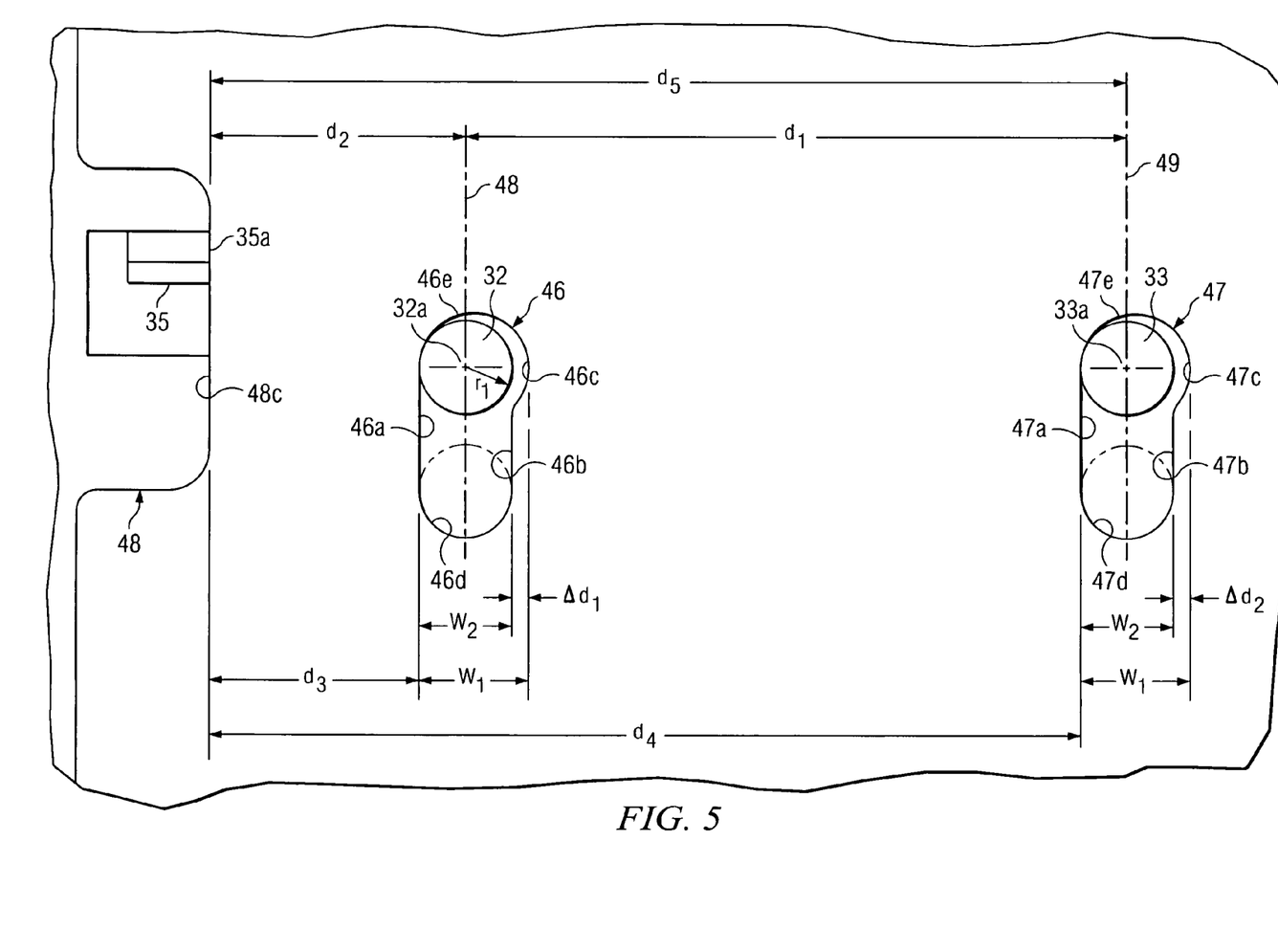
FIG. 5 is a side view diagrammatic illustration of an impact diverter mechanism implemented in the load and unload apparatus shown in FIGS. 1-4 in accordance with a preferred embodiment of the present invention.

FIG. 5 is a side view diagrammatic illustration of an impact diverter mechanism implemented in apparatus 10 shown in FIGS. 1-4 in accordance with a preferred embodiment of the present invention. The impact diverter mechanism comprises protrusion 35 that extends laterally from shuttle side surface 36, flange 48 of side plate 40, and curved edges 46c and 47c of respective slots 46 and 47. Posterior edge 35a of protrusion 35 may be brought into abutment with vertical edge 48c of flange 48. Vertical edge 48c constrains protrusion 35 to rectilinearly reciprocate vertically upward and downward when protrusion 35 is in abutment with flange 48.

Slots 46 and 47 have parallel longitudinal axes 48 and 49. Slot 46 comprises anterior vertical edge 46a, posterior vertical edge 46b, and curved posterior edge 46c. Lower edge 46d and upper edge 46e may be contoured, e.g., parabolic, semi-circular, or otherwise curved, to facilitate a secure engagement of guide pin 32 with the top or bottom surface of slot 46. Curved posterior edge 46c provides a greater width w1 of slot 46 and gradually tapers to a width w2 provided between anterior vertical edge 46a and posterior vertical edge 46b. Likewise, slot 47 comprises anterior vertical edge 47a, posterior vertical edge 47b and curved posterior edge 47c terminated by contoured lower and upper edges 47d and 47e. The width w1 is provided between anterior vertical edge 47a and curved posterior edge 47c. The width of slot 47 tapers from the width w1 to the lesser width w2 provided between anterior vertical edge 47a and anterior vertical edge 47b.

In the illustrative example, guide pins 32 and 33 are shown displaced upward at a vertical displacement within slots 46 and 47. That is, the diagrammatic illustration shown in FIG. 5 is representative of the configuration between guide pins 32 and 33 and slots 46 and 47 when shuttle 30 is located in the unloaded position within apparatus 10. Positioning of guide pins 32 and 33 within slots 46 and 47 when shuttle 30 is placed in the loaded position is illustratively designated with dashed circles. Curved posterior edges 46c and 47c provide a clearance between the aft surface of slots 46 and 47 and the radial surface of guide pins 32 and 33. Protrusion 35 is disposed on shuttle side surface 36 such that contact of guide pins 32 and 33 with curved posterior edges 46c and 47c is averted. Thus, when a storage medium is inserted into shuttle 30, the impact force resulting from the storage medium insertion is not conveyed to guide pins 32 and 33. Advantageously, the impact force of the storage medium insertion is conveyed to flange 48 of fixed plate 40 and shuttle side surface 36 by way of protrusion 35.

Impact diversion resulting from insertion of a storage medium into shuttle 30 is provided by the displacement of protrusion 35 from guide pins 32 and 33, and the displacement of flange 48 from slots 46 and 47. Flange vertical edge 48c is displaced from anterior vertical edge 46a of slot 46 by a distance $d_3$, and flange vertical edge 48c is displaced from vertical anterior edge 47a of slot 47 by a distance $d_4$. Protrusion posterior edge 35a is displaced from guide pin center 32a by a distance $d_2$ and from guide pin center 33a by a distance $d_5$. Guide pins 32 and 33 have radii of $r_1$. Transfer of an impact force applied to shuttle 30 is diverted from guide pin 32 by selecting the displacement distance $d_2$ between protrusion posterior edge 35a and guide pin center 32a such that the sum of the displacement distance $d_2$ and guide pin radius $r_1$ is less than the sum of the displacement distance $d_3$ between flange vertical edge 48c and anterior vertical edge 46a of slot 46 and slot width w1. A clearance distance $\Delta d_1$ for guide pin 32 and slot 46 when shuttle 30 is placed in the unloaded position is defined by the following:

$$\Delta d_1 = (d_3 + w1) - (d_2 + r1). \quad \text{equation 1}$$

Likewise, transfer of an impact force applied to shuttle 30 is diverted from guide pin 33 by selecting the displacement distance $d_5$ between protrusion posterior edge 35a and guide pin center 33a such that the sum of the displacement distance $d_5$ and the guide pin radius $r_1$ is less than the sum of the displacement distance $d_4$ and the slot width w1. A clearance distance $\Delta d_2$ for guide pin 33 and slot 47 is defined by the following:

$$\Delta d_2 = (d_4 + w1) - (d_5 + r1). \quad \text{equation 2}$$

Figure 6A:
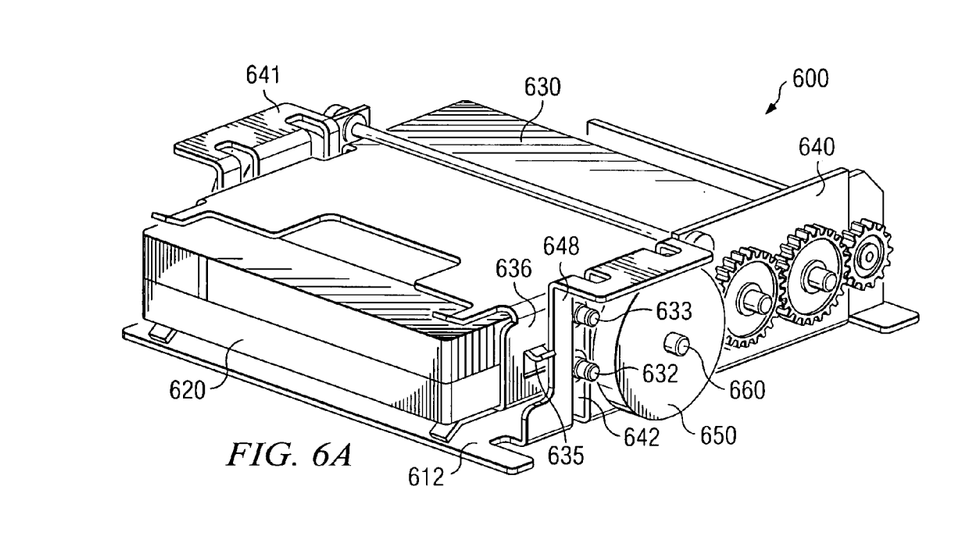
FIGS. 6A and 6B are respective diagrammatic perspective and side view illustrations of a cam actuated load and unload apparatus for guiding and securing a storage medium into proximity with a read/write device in accordance with a preferred embodiment of the present invention.
Figure 6B:
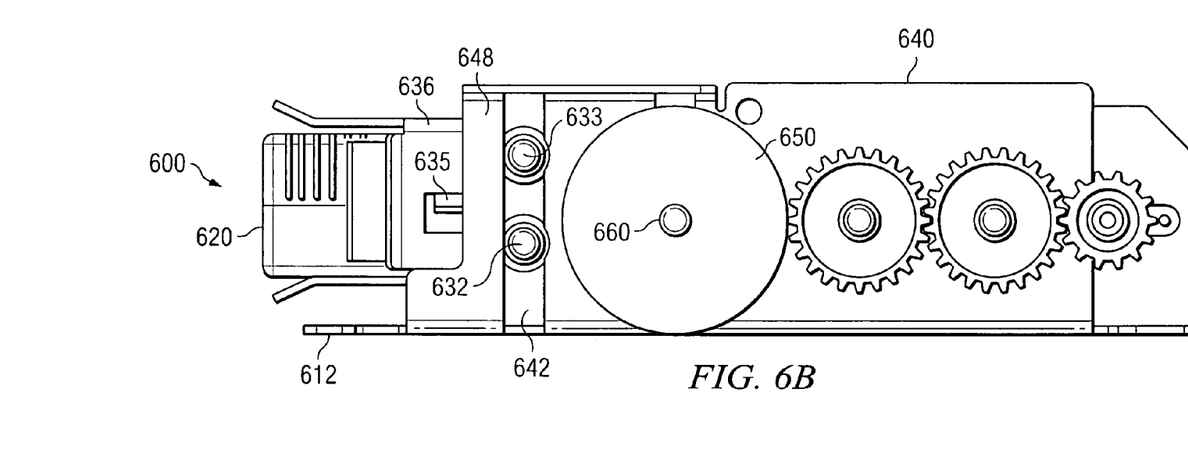

In another embodiment of the present invention, impact diversion for pins of a storage medium load and unload apparatus having a cam actuated elevator mechanism is provided. FIGS. 6A and 6B are respective diagrammatic perspective and side view illustrations of load and unload apparatus 600 for guiding and securing a storage medium into proximity with a read/write device in accordance with a preferred embodiment of the present invention. Apparatus 600 comprises base plate 612 and side plates 640 and 641. Additionally, apparatus 600 comprises shuttle 630 that receives storage medium 620 and carries storage medium 620 when loading and unloading to and from apparatus 600. Side plates 640 and 641 are fixed to base plate 612. Guide pins 632 and 633 extend laterally from shuttle side surface 636. Vertical slot 642 of side plate 640 is engaged by guide pins 632 and 633 and constrains the motion of guide pins 632 and 633 to rectilinearly upward and downward displacements. Protrusion 635 extends from shuttle side surface 636 and is situated for abutment with flange 648 disposed on side plate 640. Cam 650 is rotationally mounted adjacent to side plate 640 by shaft 660. Cam 650 may be rotationally driven by a belt and pulley assembly, a drive shaft, or another suitable mechanism. A corresponding cam is similarly configured adjacent to side plate 641.

Figures 7, 8, 9:
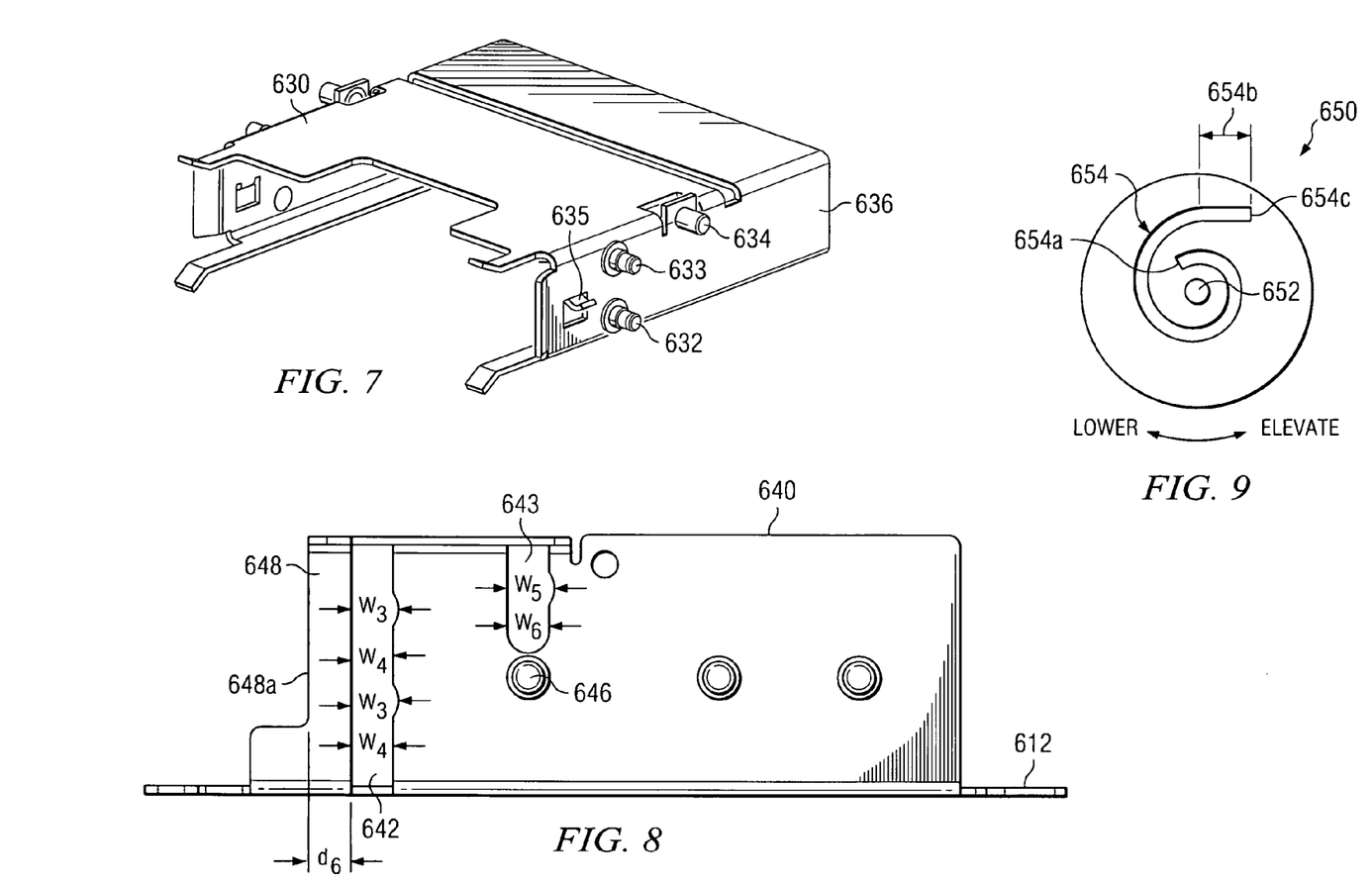
FIG. 7 is a diagrammatic perspective illustration of a shuttle of the load and unload apparatus shown in FIGS. 6A and 6B in accordance with a preferred embodiment of the present invention.
FIG. 8 is a diagrammatic side view illustration of a side plate of the load and unload apparatus shown in FIGS. 6A-7 in accordance with a preferred embodiment of the present invention.
FIG. 9 is a diagrammatic side view illustration of a cam for actuating a cam pin of the load and unload apparatus shown in FIGS. 6A-8 in accordance with a preferred embodiment of the present invention.

FIG. 7 is a diagrammatic perspective illustration of shuttle 630 of apparatus 600 shown in FIGS. 6A and 6B in accordance with a preferred embodiment of the present invention. Guide pins 632 and 633 are vertically aligned and are elongate members that extend laterally from shuttle side surface 636. Cam pin 634 is an elongate member that extends laterally from shuttle side surface 636. Cam pin 634 is actuated by engagement with cam 650 shown in FIGS. 6A and 6B and provides an elevator mechanism for displacing shuttle 630 when rotationally engaged by cam 650.

FIG. 8 is a diagrammatic side view illustration of side plate 640 of apparatus 600 shown in FIGS. 6A and 6B in accordance with a preferred embodiment of the present invention. Flange 648 comprises an elongate structure having vertical edge 648a with which protrusion 635 of shuttle 630 is engageable. Slot 642 includes curved edges for providing a clearance with guide pins 632 and 633. Cam pin slot 643 is engageable with cam pin 634 of shuttle 630. Cam pin slot 643 is an elongate slot vertically aligned for constraining the motion of cam pin 634 when actuated with cam 650. Cam pin slot 643 includes a curved edge for providing a clearance with cam pin 634. Cam aperture 646 is engageable with shaft 660 that provides a rotational coupling of cam 650 with side plate 640. The relative positioning of flange 648 with slot 642 in conjunction with the relative positions between protrusion 635, guide pins 632 and 633, and cam pin 634 provides an impact diversion mechanism for prohibiting the transfer of an impact force applied to shuttle 630 from being conveyed to guide pins 632 and 633 and cam pin 634 of shuttle 630.

FIG. 9 is a diagrammatic side view illustration of cam 650 for actuating cam pin 634 in accordance with a preferred embodiment of the present invention. Cam 650 provides a side cam elevator mechanism by engagement of cam 650 with cam pin 634. Cam 650 comprises a circular cross section. Spiral slot 654 is located on a surface of cam 650 and is engageable with cam pin 634. Spiral slot 654 radially extends from inner slot edge 654*a* to a linear slot portion 654*b* that terminates at outer slot edge 654*c*. Linear slot portion 654*b* provides a clearance with cam pin 634 when shuttle 630 is located in the unloaded position. Cam 654 may be reciprocally rotated clockwise and counter clockwise for elevating and lowering shuttle 630 as shown by the double headed arrow. Particularly, spiral slot 654 applies an upward displacement of cam pin 634 within cam slot 643 when cam 650 is rotated counter clockwise, and spiral slot 654 applies a downward displacement of cam pin 634 within cam slot 643 when cam 650 is rotated clockwise.

Figure 10A:
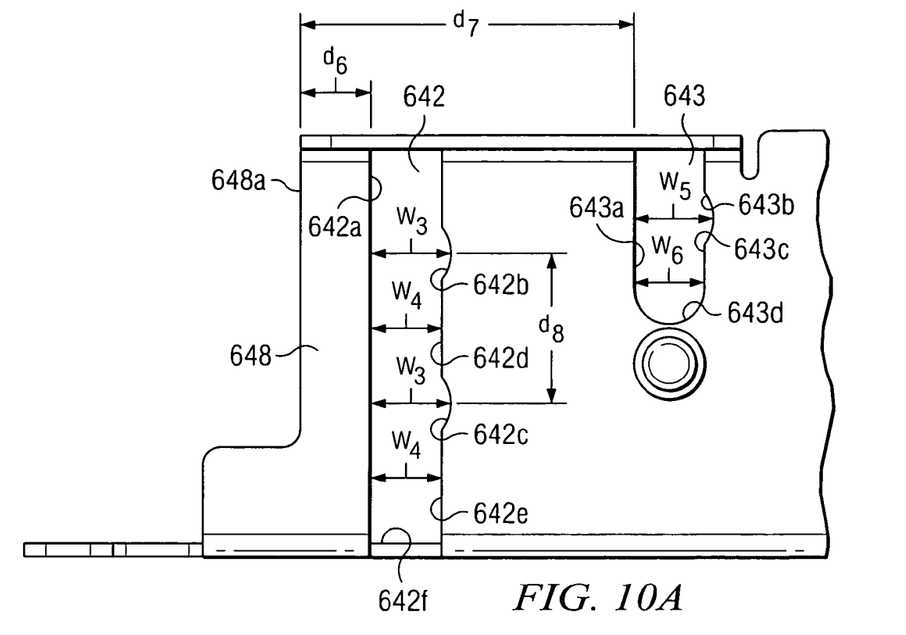
FIG. 10A is a diagrammatic partial side view illustration of the side plate shown in FIG. 8 in accordance with a preferred embodiment of the present invention.

FIG. 10A is a partial diagrammatic side view illustration of side plate 640 that shows the configuration of flange 648, slot 642 and cam slot 643 in accordance with a preferred embodiment of the present invention. Flange 648 comprises vertical edge 648*a* for receiving a storage medium insertion impact force from protrusion 635 and for constraining the motion of protrusion 635 to rectilinear upward and downward displacements when protrusion 635 is in abutment with flange vertical edge 648*a*. Slot 642 comprises anterior vertical edge 642*a* and two curved posterior edges 642*b* and 642*c*. Vertical posterior edge 642*d* is disposed intermediate curved posterior edges 642*b* and 642*c*. Vertical anterior edge 642*a* and vertical posterior edge 642*e* terminate at lower edge 642*f*. Slot 642 has a larger width w3 at curved posterior edges 642*b* and 642*c* that a width w4 between vertical anterior edge 642*a* and vertical posterior edges 642*d* and 642*e*.

Cam slot 643 includes vertical anterior edge 643*a*, curved posterior edge 643*b*, and vertical posterior edge 643*c*. Vertical anterior edge 643*a* and vertical posterior edge 643*c* terminate at lower edge 643*d*. Lower edge 643*d* may be contoured to facilitate secure abutment of cam pin 634 when shuttle 630 is placed in the loaded position. Slot 643 has a larger width w5 at curved posterior edge 643*b* and vertical anterior edge 643*a* than a width w6 between vertical anterior edge 643*a* and vertical posterior edge 643*c*.

Flange vertical edge 648*a* is disposed at a distance $d_6$ from vertical anterior edge 642*a* of slot 642, and flange vertical edge 648*a* is disposed at a distance $d_7$ from vertical anterior edge 643*a* of cam slot 643. The maximum widths of curved posterior edges 642*b* and 642*c* are vertically displaced at a distance $d_8$.

Figure 10B:
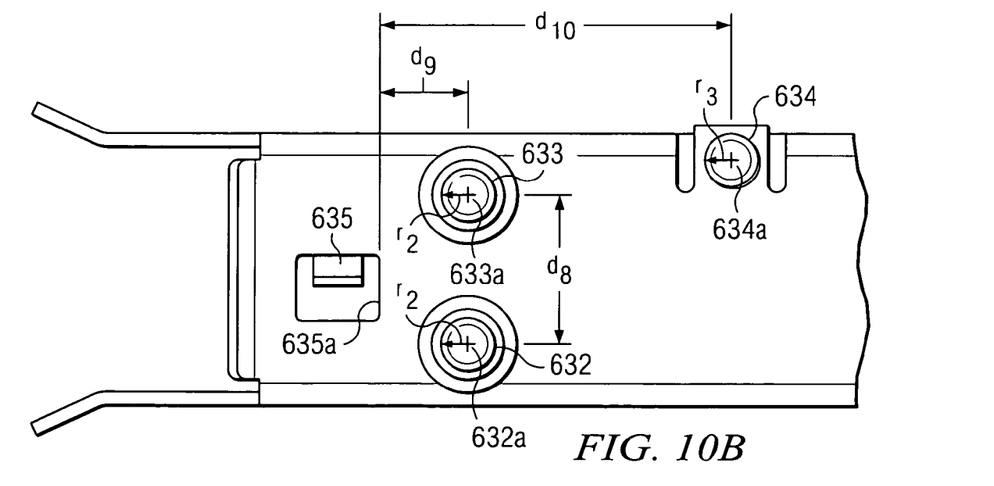
FIG. 10B is a diagrammatic partial side view illustration of the shuttle shown in FIG. 7 in accordance with a preferred embodiment of the present invention.

FIG. 10B is a diagrammatic partial side view illustration of the configuration of protrusion 635, guide pins 632 and 633, and cam pin 634 in accordance with a preferred embodiment of the present invention. Guide pins 632 and 633 have radii of $r_2$ and are vertically displaced by the distance $d_8$. Posterior edge 635*a* of protrusion 635 is longitudinally displaced at a distance $d_9$ from the vertical axis of guide pins 632 and 633, that is from centers 632*a* and 633*a* of guide pins 632 and 633. Cam pin 634 has a radius of $r_3$ and cam pin center 634*a* is longitudinally displaced at a distance $d_{10}$ from protrusion posterior edge 635*a*.

Transfer of an impact force applied to shuttle 630 to guide pins 632 and 633 is diverted by selecting the displacement distance $d_9$ between protrusion posterior edge 635*a* and guide pin centers 632*a* and 633*a* such that the sum of the displacement distance $d_9$ and the guide pin radius $r_2$ is less than the sum of the displacement distance $d_6$ between flange vertical edge 648*a* and vertical anterior edge 642*a* and the slot width w3 at curved posterior edges 642*b* and 642*c*. A clearance distance $\Delta d_3$ for guide pins 632 and 633 and slot 642 is thus defined by the following:

$$\Delta d_3 = (d_6 + w3) - (d_9 + r_2) \qquad \text{equation 3}$$

Likewise, transfer of an impact force applied to shuttle 630 to cam pin 634 is diverted by selecting the displacement distance $d_{10}$ between protrusion posterior edge 635*a* and cam pin center 634*a* such that the sum of the displacement distance $d_{10}$ and the cam pin radius $r_3$ is less than the sum of the displacement distance $d_7$ between flange vertical edge 648*a* and vertical anterior edge 643*a* and the slot width w5 at curved posterior edge 643*b*. A clearance distance $\Delta d_4$ for cam pin 634 cam slot 643 is thus defined by the following:

$$\Delta d_4 = (d_7 + w5) - (d_{10} + r_3) \qquad \text{equation 4}$$

As described, the present invention provides an apparatus and method for diverting an impact force imparted in a storage medium load and unload apparatus. An elevator mechanism comprising guide pins are provided with a clearance from a fixed side plate slot with which the guide pins are engaged. The slots with which the guide pins are engaged have curved surfaces that extend beyond the radial surface of the guide pins when the shuttle is in an unloaded position for accepting a storage medium. A protrusion that extends from a side surface of a shuttle is configured to impact a flange on a side plate in the load and unload apparatus. Additionally, a side cam actuated elevator is provided with a cam slot that includes a curved surface for providing a clearance between a cam pin of the elevator mechanism. A protrusion extending from a shuttle side surface is positioned to impact a flange of a fixed side plate of the apparatus such that the impact force resulting from insertion of a storage medium into the shuttle is conveyed to the protrusion and the flange.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A storage medium load and unload apparatus for diverting a storage medium insertion impact force, comprising:
   a shuttle having a first pin with a first radius extending from a side surface of the shuttle and a protrusion having a posterior edge extending from the side surface, wherein the posterior edge is displaced a first distance from a center of the first pin; and
   a fixed side plate having a flange with a vertical edge and a first slot with which the first pin is engaged has an anterior edge and a curved posterior edge with a first width between the anterior edge and the curved posterior edge, wherein the vertical edge of the flange is displaced a second distance from the anterior edge of the first slot,
   wherein a sum of the first width and the second distance is greater than the sum of the first distance and the first radius.

2. The apparatus of claim 1, wherein the first slot has a vertical posterior edge conjoined with the curved edge and displaced vertically below the curved posterior edge, wherein a second width of the first slot at the vertical posterior edge is less than the first width.

3. The apparatus of claim 1, wherein the protrusion is constrained to vertical displacements when in abutment with the vertical edge of the flange.

4. The apparatus of claim 1, wherein the shuttle comprises a second pin having a second radius extending from the side surface, the second pin displaced by a third distance from the protrusion posterior edge, and the fixed plate comprises a second slot having an anterior edge and a curved posterior edge with the first width separating the anterior edge and the curved posterior edge of the second slot, wherein the second pin is engaged with the second slot and a sum of the first width and the second distance is greater than a sum of the third distance and the second radius.

5. The apparatus of claim 1, further comprising:

a moveable side plate having a partially ramped slot with a horizontal slot portion and a ramped slot portion, wherein the first pin is engaged with the partially ramped slot.

6. The apparatus of claim 5, wherein the moveable side plate comprises a horizontal slot, and the shuttle comprises a second pin extending from the side surface, wherein the second pin is engaged with the horizontal slot.

7. The apparatus of claim 1, further comprising:

a cam having a spiral slot extending from a first radius of the cam to a second radius of the cam, wherein the pin is engaged with the spiral slot.

8. The apparatus of claim 7, wherein the shuttle is displaceable from an unloaded position to a loaded position, wherein an outer end of the spiral slot is positioned outside the first slot when the shuttle is positioned in the unloaded position.

9. The apparatus of claim 1, wherein the first slot comprises a second curved surface with the first width between the second curved surface and the anterior edge, and the shuttle comprises a second pin extending from the side surface, wherein the second pin is engaged with the first slot.

10. The apparatus of claim 9, wherein a maximum width between the anterior edge and the first curved surface is vertically displaced by a third distance from a maximum width between the anterior edge and the second curved surface.

11. The apparatus of claim 10, wherein the first pin and the second pin are vertically displaced by the third distance.

12. The apparatus of claim 1, wherein a width of the first slot tapers from the first width to a second width less than the first width.

13. The apparatus of claim 12, wherein the second width is located vertically below the first width.

14. The apparatus of claim 1, wherein the first pin is rectilinearly displaceable within the first slot.

15. The apparatus of claim 1, wherein the shuttle has a cavity configured to accept a storage medium; and wherein the apparatus further comprises an elevator mechanism for reciprocally elevating and lowering the shuttle.

16. The apparatus of claim 15, wherein the protrusion is brought into abutment with the flange on application of an impact force resulting from insertion of the storage medium into the cavity in the shuttle.

17. The apparatus of claim 15, wherein the first pin extends from the side surface and the slot has a tapered width, and wherein the first pin is engaged with the slot at a first position in the slot having a first width when the shuttle is located in an unloaded position for reception of the storage medium.

18. The apparatus of claim 17, wherein the shuttle is reciprocally displaceable from the unloaded position to a loaded position, wherein the first pin is engaged with the slot at a second position in the slot having a second width when the shuttle is located in the loaded position, the first width being greater than the second width.

* * * * *